United States Patent [19]

Bowell, Sr.

[11] Patent Number: 5,588,350
[45] Date of Patent: Dec. 31, 1996

[54] MANUFACTURE OF BANDED PISTONS

[75] Inventor: Richard A. Bowell, Sr., Huber Heights, Ohio

[73] Assignee: Freudenberg-NOK General Partnership, Plymouth, Mich.

[21] Appl. No.: 431,151

[22] Filed: Feb. 10, 1995

Related U.S. Application Data

[63] Continuation-in-part of Ser. No. 236,019, May 13, 1994, which is a continuation-in-part of Ser. No. 86,054, Jul. 6, 1993, Pat. No. 5,345,860.

[51] Int. Cl.⁶ .................................. F16J 9/00; F16K 41/00
[52] U.S. Cl. .................................. 92/192; 92/250; 277/170; 29/888.049
[58] Field of Search .................................. 92/192, 240, 250, 92/249, 254; 277/170, 171, 172; 29/888.04, 888.047, 888.049; 188/322.18

[56] References Cited

U.S. PATENT DOCUMENTS 2,176,281 10/1939 Stillwagon .................................. 92/254
3,212,411 10/1965 Storms.
3,730,305 5/1973 Fouts .................................. 188/322.18 X
5,345,860 9/1994 Bowell .................................. 92/192
5,435,233 7/1995 Bowell .................................. 92/192

*Primary Examiner*—Hoang Nguyen
*Attorney, Agent, or Firm*—Dinnin & Dunn, P.C.

[57] ABSTRACT

A banded cylindrical piston for use in fluid cylinders is produced by hot-forming a relatively thin, flat washer made of polytetrafluoroethylene (PTFE) onto a grooved piston. A hot-forming sizing tube has a beveled entrance end on which the washer is initially preheated, a first section of a greater diameter than the end diameter of a finished unit for preliminarily elongating the preheated washer as it assumes sleeve shape and a final hot-forming second section in which the PTFE material is forced to flow under pressure into the piston grooves. The cross-sectional configuration of the groove or grooves is such as to enhance flowability of the material during hot-forming toward and into contact with a side of the groove nearest the head end of the piston to improve the mechanical gripping effect of band to piston. The side of the groove nearest the head end of the piston is preferably at an acute angle relative to an adjacent land on the periphery of the piston.

14 Claims, 1 Drawing Sheet

MANUFACTURE OF BANDED PISTONS

The application is a continuation-in-part of my co-pending U.S. patent application Ser. No. 08/236,019 filed May 13, 1994 which in turn is a continuation-in-part of my Ser. No. 086,054, now U.S. Pat. 5,345,860 filed Jul. 6, 1993 and granted Sep. 13, 1994.

This invention relates to the manufacture of fluoropolymer-banded pistons used in automotive McPherson struts and other shock-absorbing fluid cylinders and to a particular piston groove configuration which greatly benefits from such manufacture.

BACKGROUND OF THE INVENTION

The typical manufacturing method and groove configuration of hot-formed banded pistons are shown in Storms U.S. Pat. No. 3,212,411 granted Oct. 19, 1965. Its hot-forming and cooling tubes first hot-form the material to a piston periphery and then cool it in order to retain the formed cylindrical shape. The grooves are generally like the sixty degree screw threads commonly known as American National Standard. With but very few exceptions, this is also believed to have been the thread shape and angle norm in the banded piston industry since the advent of the Storms invention almost thirty years ago. One recent exception is a "square" grooved piston which has been reported to have originated in Japan.

Whether the grooves are of the type depicted in the aforementioned Storms patent, square-grooved or anything in between, it is unlikely that with the conventional hot-forming technology used to manufacture banded pistons, the grooves can be sufficiently filled with material to reduce or eliminate "blow-by". The latter term is used in the piston-banding industry to describe a popping-off of the band from the piston due to an extremely high hydraulic or pneumatic shock load applied from the side of the piston opposite its head end while performing in a fluid cylinder.

SUMMARY OF THE INVENTION

A banded cylindrical piston for use in fluid cylinders is produced by preliminarily preheating a relatively thin, flat washer made of polytetrafluoroethylene (PTFE) while resting it on a beveled entrance end of a hot-forming tube for a short time period, passing it relatively quickly through a first tube section heated above hot-forming temperature to commence forming the washer to the piston while simultaneously elongating it axially into sleeve form, and then finally hot-forming it to its final dimension under radially-inward pressure in a tube section slightly smaller in diameter than the first section. The cross-sectional configuration of the groove or grooves is such as to enhance flowability of the material during hot-forming toward and into contact with a side of the groove nearest the head end of the piston to ultimately improve the mechanical gripping effect of band to piston and thereby eliminate or reduce the potential fop "blow-by". The side of the groove nearest the head end of the piston is relatively perpendicular to the piston axis, being on the order of between 75 to 95 degrees with respect to an adjacent cylindrical land at the piston periphery. The other side of the groove forms a material-directing ramp which forces flowing material entering the groove during hot-forming axially toward the relatively perpendicular side of the groove. The end result is a piston band which grips the piston more tightly than any previously known, and which inherently has a tail end which is laterally square and defines a nice lip seal with the cylinder in which it is to operate.

A principal object of the invention is to provide a novel hot-forming tube construction and method which enables PTFE to be pressed into a novel piston groove configuration and essentially fill the groove, while simultaneously inherently providing a square band end and outwardly-flaring lip seal at that end.

More specifically, it is an object of the invention to provide a hot-forming tube having a beveled entrance end for preheating a washer attached to a head end of a piston, a first tube section of a first diameter for primarily elongating the washer as it is converted into sleeve shape, and a second conventional hot-forming section of an internal diameter smaller than the first tube section diameter to accomplish the essential radially-inward pressuring of the material into the grooves and final sizing of the band.

Another object of the invention is to provide a piston groove configuration which resists blow-by during operation of the piston in a fluid cylinder, while also enhancing filling of the groove during the hot-forming banding process.

Other objects will become apparent from the following description, in which reference is made to the accompanying drawings.

DESCRIPTION OF THE PREFERRED EMBODIMENT

Figure 1:
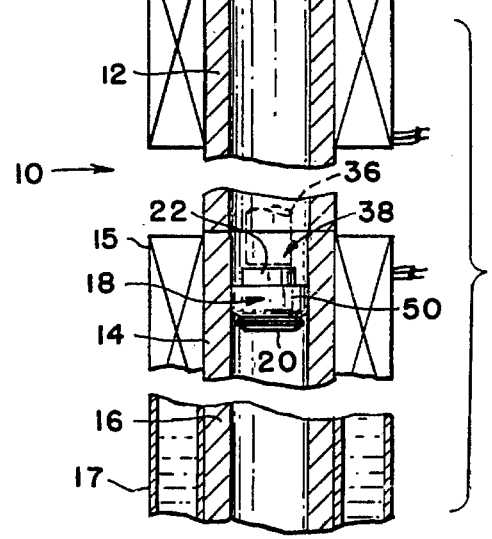
FIG. 1 is a fragmentary elevational view of the novel preheating, washer-elongating and hot-forming structure of my invention.

FIG. 1 illustrates a hot-forming banding or sizing tube 10 having a preheating section 12 and a hot-forming section 14 coaxially aligned therewith. Sections 12 and 14 are made of conventional heat-conducting metal and are provided with electric heater jackets 13 and 15. The heaters 13 and 15 heat their respective sections to within the range of approximately 500° F. to 800° F. An extension of section 14 becomes cooling portion 16, which is maintained at a temperature of about 70 degrees F. by water passing through a jacket 17. The inside diameter of sections 14 and 16 is essentially the same as the finished product which is to be installed in a fluid cylinder, while the inside diameter of section 12 is slightly greater by about 0.010 to 0.020 inches. The diameter differences of the sections will vary for the manufacture of different size pistons, different thickness washers and different depth piston grooves. For purposes of a better understanding of this invention, the entire description of my U.S. Pat. No. 5,345,860 is incorporated herein.

A piston 18 having a head end 20 and a tail end 22 is shown with a polytetrafluoroethylene (PTFE) washer 24 attached in an anchoring groove 26 (FIG. 3) adjacent the head end 20 thereof. As described in my '860 patent, the washer is relatively thin and flat (approximately 0.024 to 0.032 inches) and has a central hole represented by the edge 28 in FIG. 3. When the washer is placed onto a piston, it is expanded radially outwardly by one of several different techniques, the most common being the pressing of the washer axially over an annular bevel 30 at the head end 20 of the piston. As the washer 24 expands, it passes over a narrow land 32, aligns with groove 26, relaxes due to memory retention inherent in the material of the washer, and grips at the bottom of the anchoring groove. At that time the washer is typically at an angle directed away from the piston head end 20, and can then be placed on a beveled entrance end 34 of the preheating section 12. It remains there for approximately six seconds and is then urged by a ram 36 through preheating section 12 to a position 38 inside the hot-forming section 14 of the tube 10. The movement of the piston to position 38 takes place over approximately two seconds during which the washer elongates toward the tail end 22 of the piston as it is being converted to sleeve condition. During this passage, some PTFE material is also forced into material-receiving grooves to be described later. As stated, the inner diameter of section 12 is slightly greater than that of section 14. Also during passage through section 12, depending again on the particular washer size and thickness, the washer may elongate as much as 0.040 inches or more toward the tail end 22 of the piston. Primary groove filling via hot-forming pressure occurs in section 14, where the washer elongates only a small additional amount. A next piston is placed on the beveled entrance end 34 and is similarly preheated and pushed by the ram 36 through section 12 and into the hot-forming section 14. As the second unit arrives at position 38, it indexes the first piston downwardly while continuing to hot-form the latter's washer into the grooves in the piston periphery. Eventually, after each piston has been in the section 14 for approximately one-and-one-half minutes, it arrives at the cooling portion 16 of the tube 10, where the PTFE flowability is discontinued and the band solidifies. All of this is described in greater detail in my '860 patent. Let it be understood that the temperatures and times may differ for each particular formulation of PTFE washer, the washer thickness, the depth of the grooves in the piston periphery and other variables.

Figure 2:
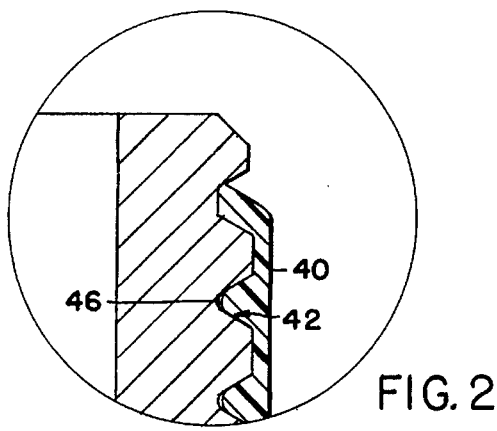
FIG. 2 is a cross-sectional enlargement of a head-end portion of the commercial version of a prior art piston according to the aforementioned Storms patent (as its design was subsequently modified) to include an anchoring groove for initially capturing a washer having a central hole.
Figure 4:
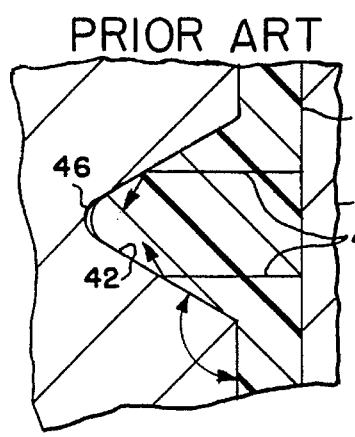
FIG. 4 is a greatly enlarged view of a single annular band-gripping groove of the prior art piston of FIG. 2.

A normally solid washer 24 according to the prior art (as modified) is shown converted into a band 40 in FIG. 2, and the band is shown enlarged in FIG. 4. During hot-forming, the PTFE material became flowable and was pressed into a plurality of annular V-grooves 42. This has been the standard groove configuration for banded pistons for almost thirty years. The material has a relatively large coefficient of expansion and is believed to flow under the pressure and heat in the direction of arrows 49, squeezing radially inwardly toward the bottom of the V. The standard groove depth has been approximately 0.025 inches. In essence, both sides of the V act are believed to act as ramps to direct the material toward the groove bottom. As discussed in the aforementioned Storms patent, an expansion space 46 is provided at the bottom of the V to accommodate thermal expansion of the PTFE under high temperature operating conditions in a strut.

Figure 3:
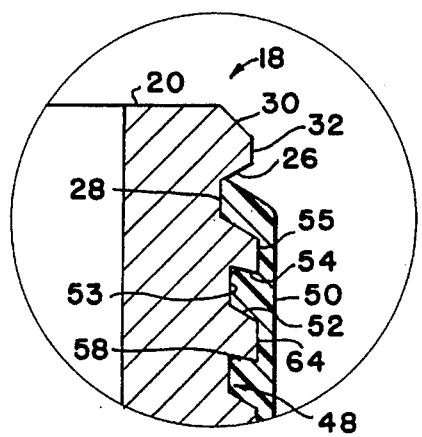
FIG. 3 is an enlargement of a similar portion of a piston to that shown in FIG. 2, illustrating the preferred improved groove configuration of the invention of this application over that of Storms shown in FIG. 2.
Figure 5:
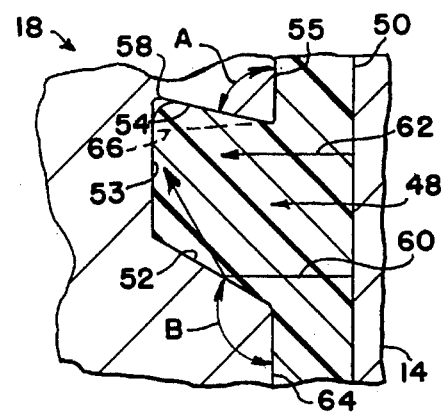
FIG. 5 is a greatly enlarged view of a single annular band-gripping groove of the improved piston of FIG. 3.

FIG. 5 is an enlargement of a single annular groove 48 and band 50 of the improvement depicted in FIG. 3. It illustrates a material-directing ramp 52 at the side of the groove 48 nearest the tail end 22 of the piston. Ramp 52 is opposed by a side wall 54 which forms an angle A relative to an adjacent land 55. Angle A is preferable acute to provide an interlocking effect for mechanically gripping the band 50 to inhibit hydraulic or pneumatic force directed upwardly as viewed in FIG. 5 from causing "blow-by" of the band from the piston during operation in a fluid cylinder (not shown).

As the material becomes flowable in response to its raised temperature during hot-forming, it is forced against ramp 52 and therefrom generally axially toward the juncture of a bottom wall 53 and side wall 54, as represented by the tiny expansion space 58, providing the groove 48 is not filled completely, as if often is when using the hot-forming technique of this invention. There is no opposing ramp such as in V-groove 42 of the prior art construction, thus, the material is not resisted as it tends to flow in the direction of arrow 60 toward space 58. In fact, flow of material adjacent the side wall 54 in the direction of arrow 62 assists flow toward and into contact with the side wall 54, further improving the mechanical gripping capability of the band 50 with the periphery and grooves 48.

Groove 48 can be shallower than that of the prior art, 0.017 inches nominal as compared to the 0.025 inches in FIG. 4. The range of depth, depending on the particular design, may be in the order of 0.012 to 0.020 inches. Band thickness of PTFE from the land 55 and a land 64 to the outer periphery of the band 50 is nominally 0.010 inches, but may range between approximately 0.008 and 0.012 inches.

While I have illustrated a ramp 52 which forms the ideal obtuse angle B of one hundred twenty degrees with respect to land 64 at the outermost end of the ramp, it is likely that the obtuse angle may range from approximately one hundred fifteen to about one hundred twenty five degrees and still perform the desired material-directing function. Also, while the preferred angle A is acute and illustrated as seventy eight degrees in FIG. 5, other angles, even a right angle or a slightly obtuse angle of about ninety five degrees (shown by dotted line 66) is likely able to perform the desired functions.

Various changes made be made without departing from the spirit and scope of the claims.

Having described my invention, I claim:

1. Apparatus for banding a relatively thin, flat fluoropolymer washer having a central hole onto an outer cylindrical surface of a piston having a head end, a tail end, a circumferential washer anchoring groove closely adjacent said head end and a plurality of circumferential material-receiving grooves intermediate said anchoring groove and said tail end, and wherein said washer is mounted in said anchoring groove with the washer assuming a circumferentially-beveled shape having the largest diameter of the bevel located toward said piston tail end, said apparatus comprising:

a heat-conducting banding tube having a cylindrical internal diameter greater than the piston diameter and essentially of the diameter of a hydraulic or pneumatic cylinder with which said piston is to be ultimately cooperatively assembled;

means for heating said banding tube to a predetermined hot-forming temperature for a predetermined time period to cause heated fluoropolymer to flow into said material grooves while a piston and washer assembly are located in said heated tube;

a cooling tube in coaxial alignment with said heated tube for cooling and setting the hot-formed fluoropolymer material after the washer has conformed to the cylindrical shape of the piston;

an inwardly beveled heated entrance end at that end of said heated tube opposite said cooling tube, said beveled heated end corresponding closely to the circumferentially-beveled shape of said washer in said anchoring groove;

means for applying a preheating temperature to said beveled entrance end whereby the beveled washer placed in contact with the surface of said beveled entrance end may be raised to a temperature greater than ambient temperature but less than the temperature at which said material becomes flowable; and means for sequentially urging said piston, after the washer anchored to the piston has had its beveled surface in contact with said beveled entrance end for a predetermined time period sufficient to preheat the washer, from said beveled entrance end into and through said banding and cooling tubes for time periods sufficient to hot-form and set said washer into a cylindrical band about said piston.

2. Apparatus according to claim 1 wherein said banding tube includes a first hot-forming section adjacent said beveled end and a second hot-forming section remote from said beveled end, the internal diameter of said first section being slightly in excess of the internal diameter of said second section by several thousandths of an inch.

3. Apparatus according to claim 2 wherein the second section of said tube is maintained at a temperature approximating that required to induce normal flow of the washer material during hot-forming and wherein said first section and beveled end are maintained at a temperature substantially above flow-inducing temperature.

4. Apparatus according to claim 2 wherein said urging means forces a unit which has been preheated on said beveled entrance end through said first hot-forming section over a time period approximating two to six seconds, during which time said washer commences to assume sleeve shape and elongates from said anchoring groove toward said piston tail end.

5. Apparatus according to claim 4 wherein the elongation of said washer by said second section is on the order of approximately 0.030 to 0.050 inches.

6. Apparatus according to claim 2 wherein the internal diameter of said first hot-forming section is on the order of approximately 0.010 to 0.020 inches greater than the internal diameter of said second hot-forming section.

7. The method of banding a piston having a plurality of material-receiving grooves with a relatively thin, flat fluoropolymer washer having a central hole by initially attaching the washer by-means of said central hole to grip in an anchoring groove adjacent a head end of said piston and thereafter drawing the piston and washer unit through a hot-forming sizing tube under pressure and heat to convert said washer into sleeve form encompassing the piston periphery, comprising the steps of:

providing said tube with a beveled entrance end, a first hot-forming section and a second hot-forming section through which said unit sequentially passes;

heating said first section and beveled entrance end to a temperature substantially greater than the temperature at which the material of said fluoropolymer washer becomes flowable;

heating said second section to a temperature at which said material becomes flowable sufficiently to be reshaped but below that at which said material begins to gel;

resting said unit on the beveled entrance end for a few seconds with said washer being in surface contact with said bevel and said piston head end facing toward said hot-forming sections in order to initially preheat said washer to a temperature substantially above ambient but below flow-inducing temperature;

rapidly urging said preheated unit inwardly of said tube through said first section and thereby simultaneously converting said washer into sleeve shape while elongating said sleeve away from the piston head end;

moving said unit into said second hot-forming section for a time period and under heat and pressure sufficient to cause said material to flow into the material-receiving piston grooves and tightly conform to the piston periphery; and, cooling said unit while retaining said sleeve at the diameter at which it was hot-formed in said second section until said fluoropolymer material solidifies and retains the shape to which it was hot-formed.

8. The method according to claim 7 wherein said unit rests on said beveled entrance end for a time period on the order of approximately six seconds.

9. The method according to claim 8 wherein said unit is urged through said first section for a time period on the order of approximately two seconds.

10. The method according to claim 9 wherein said unit is retained within said second section for a time period on the order of approximately ninety seconds.

11. In a cylindrical piston having a head end, a tail end, a washer-anchoring groove adjacent said head end, at least one annular groove extending generally radially inwardly from the outer surface of said piston between said anchoring groove and said tail end, and a cylindrical land on each side of said groove, a washer comprising a low coefficient of friction relatively thin polymeric material having a central hole the inside diameter of which is adapted to grip in said anchoring groove and thereafter be hot-formed in a cylindrical chamber into a band tightly mechanically gripping the surface of the piston, said band being adapted to maintain said mechanical gripping while absorbing reversible bi-directional shock loads when installed on said piston and placed in a bore of a fluid cylinder, and said material having a first solidified state when operating in said fluid cylinder and a second flowable state during hot-forming of the washer onto the piston periphery, the improvement comprising:

said at least one annular groove having axially-spaced opposing side walls, that groove side wall remote from the piston head end forming a material-directing ramp forming an obtuse angle on the order of approximately 115 to 125 degrees with respect to its adjacent land and the opposing side wall of said groove forming an angle on the order of approximately between 75 and 95 degrees with respect its adjacent land;

said band achieving said mechanical gripping with said piston peripheral surface by hot-forming said band in said cylindrical chamber at a temperature on the order of approximately 500° to 550° degrees F. while simultaneously pressing said material radially inward against said ramp to cause the material to engage said ramp and flow substantially parallel to the axis of said piston toward and into contact with the opposing side wall of said groove, whereby, upon cooling to a lower temperature at which said material again solidifies, said band resists expansion radially outward relative to the outer peripheral surface of said piston from fluid pressure applied to said piston from the direction of its tail end; and, said band material expanding inwardly toward said material-directing ramp and therefrom essentially axially inwardly toward said opposing side wall to more tightly grip said piston when said piston is operating in a fluid cylinder at a high operating temperature below said hot-forming temperature.

12. The invention set forth in claim 11 wherein said piston periphery is provided with a plurality of annular grooves all of which have the same cross-sectional configuration and dimensions.

13. The invention set forth in claim 11 wherein said at least one annular groove has a bottom wall between said opposing side walls, said bottom wall being essentially parallel to the axis and periphery of said piston.

14. The invention set forth in claim 11 wherein the depth of said at least one annular groove is on the order of approximately 0,012 to 0.020 inches and the thickness of said band between said lands and the outer cylindrical surface of said band is on the order of approximately 0.008 to 0.012 inches.

* * * * *